April 27, 1926.
A. M. THOMSEN
METHOD FOR ECONOMIC DISPOSAL OF WASTE SULPHITE LIQUOR
IN THE MANUFACTURE OF SULPHITE PULP
Filed May 13, 1924
1,582,317
2 Sheets-Sheet 1
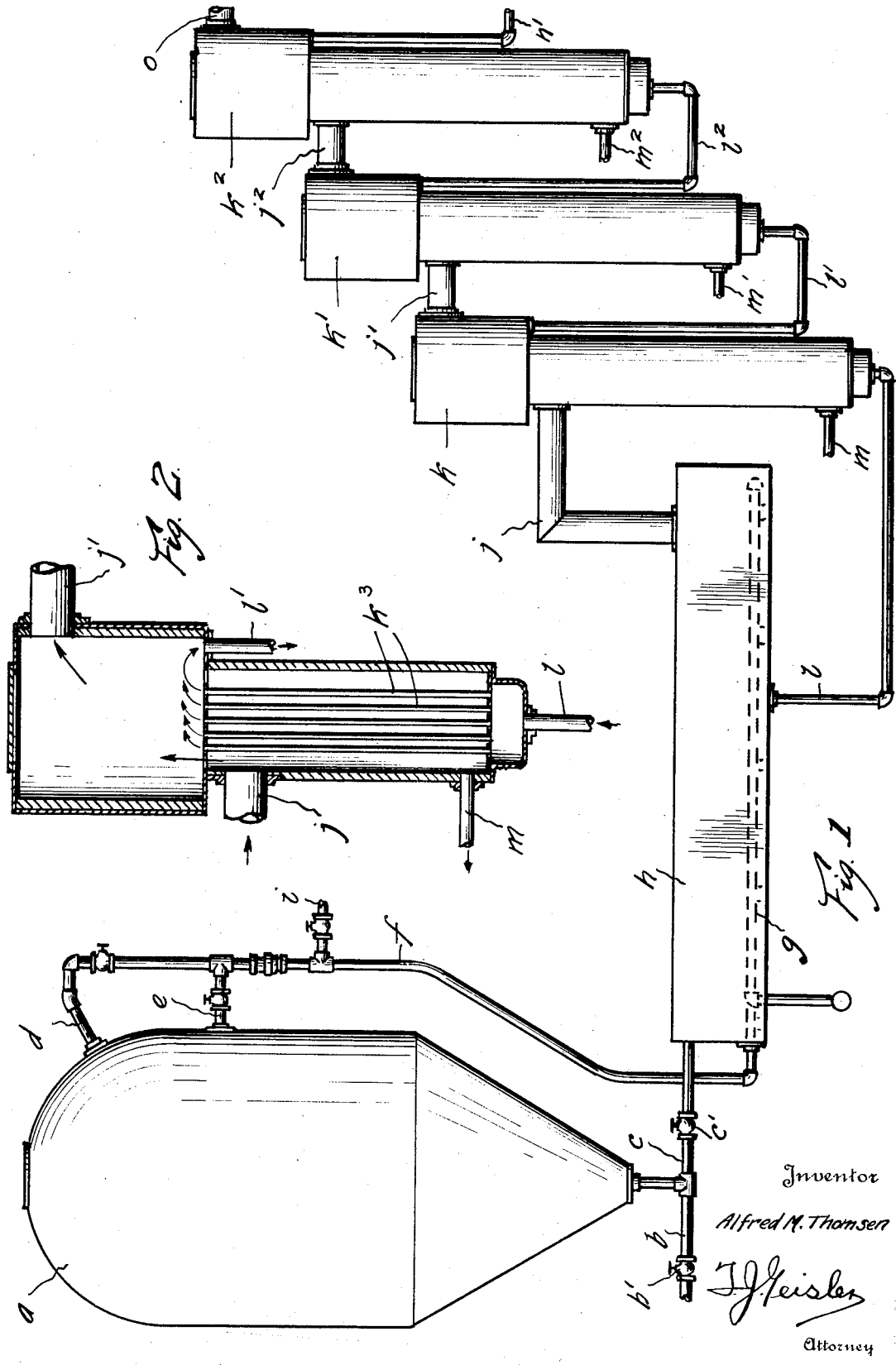
Inventor
Alfred M. Thomsen
Attorney

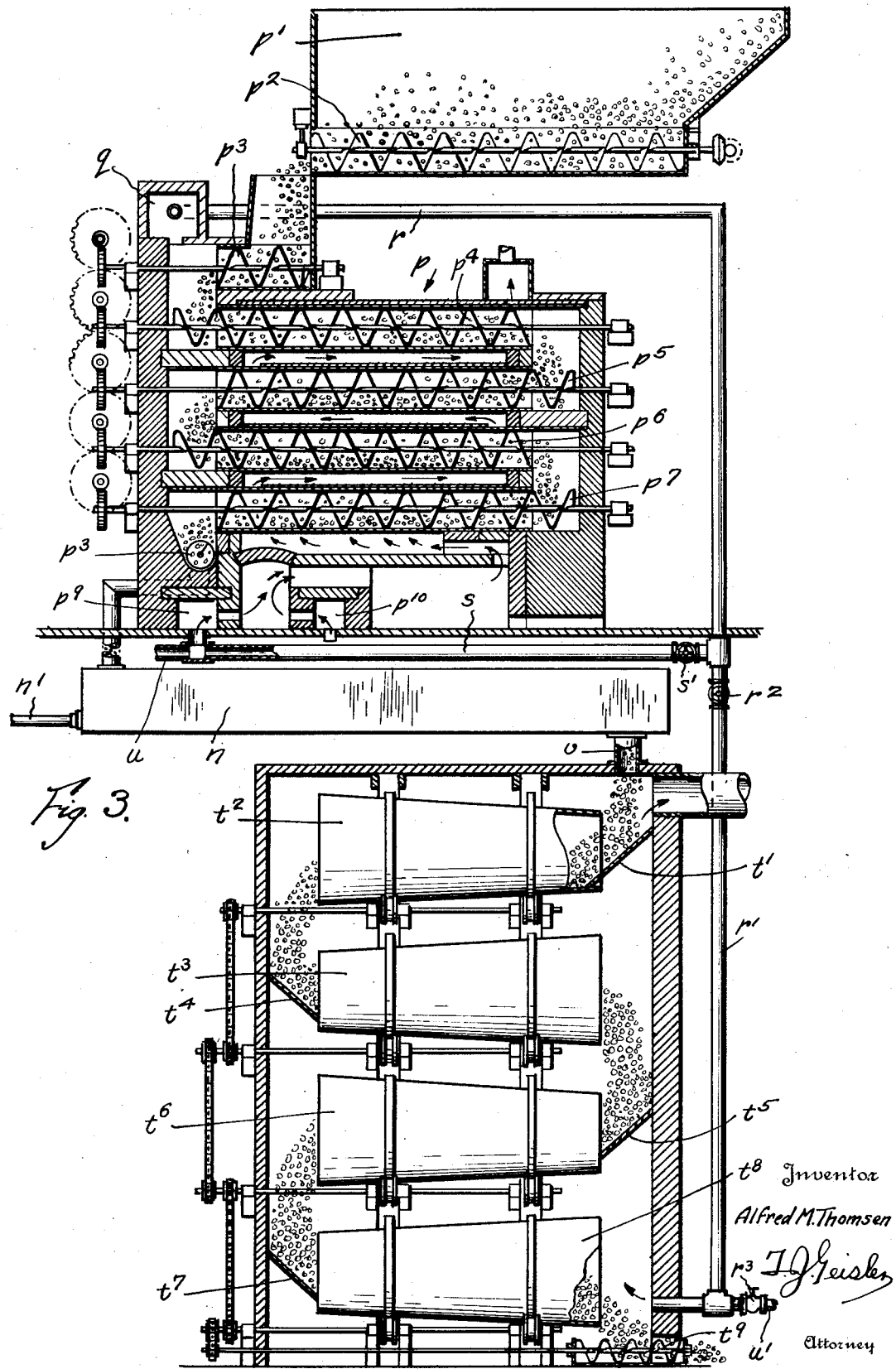

Patented Apr. 27, 1926.

1,582,317

UNITED STATES PATENT OFFICE.

ALFRED M. THOMSEN, OF FLORISTON, CALIFORNIA, ASSIGNOR TO CROWN WILLAMETTE PAPER COMPANY, OF SAN FRANCISCO, CALIFORNIA, A CORPORATION OF MAINE.

METHOD FOR ECONOMIC DISPOSAL OF WASTE SULPHITE LIQUOR IN THE MANUFACTURE OF SULPHITE PULP.

Application filed May 13, 1924. Serial No. 713,013.

*To all whom it may concern:*

Be it known that I, ALFRED M. THOMSEN, a subject of the King of Denmark, and a resident of the city of Floriston, county of Nevada, and State of California, have invented a new and useful Improvement in Methods for Economic Disposal of Waste Sulphite Liquor in the Manufacture of Sulphite Pulp, of which the following is a specification.

The object of my invention is to effect the economic disposal of the waste sulphite liquor incidental to the manufacture of sulphite pulp, without imposing additional cost on said manufacture.

Waste sulphite liquor is at present considered an unavoidable nuisance, and its disposal has long been a problem. Numerous attempts have been made to use the materials of this waste liquor but all have proved impractical. For example, the economic utilization of the waste sulphite liquor in the production of alcohol was introduced during the late World War, and such use is still practiced in Sweden. But the low grade of the raw material so obtained resulted in such high manufacturing costs that, except in special locations, this method of disposal cannot be considered commercially. Even if such disposal were profitable it does not solve the problem, because the nuisance is not abated; the discharge from the stills being just as objectionable as the original waste.

It has been attempted to use the waste liquor for the production of adhesives and binders.

Consideration has also been given to the use of the waste liquor as raw material for the production of many organic chemicals, but in general the consumption of these is so small that the market would be glutted, if only a small fraction of the paper mill waste were thus utilized. Furthermore, the cost of using the waste liquor in this manner is complicated by two factors, namely: the cost of evaporating the liquor, and the mechanical difficulties encountered in reducing the syrupy liquid obtained from the evaporators to a state of dryness.

It is known that the waste liquor contains a large amount of combustible material. Hence where it is desired solely to destroy the liquor, and thus prevent its entrance into streams directly or indirectly, the object has been attained by evaporating the liquor to the heaviest consistency possible in multi-effect evaporating apparatus, then feeding it to a revolving furnace of the cement kiln type and using the heat produced in raising the steam for the evaporation. This mode of disposal is theoretically possible, and in practice the fuel deficit is not large because of the large amount of combustible material which the waste liquor contains. Considering, however, the high original cost of construction, and the continuous repairs demanded by such type of furnace, its installation can be considered only in the nature of an incinerator, justified merely as a means for destroying an objectionable by-product; but it is in no sense a profitable operation.

I attain my object by evaporating and concentrating the waste liquor to a syrupy consistency, then absorbing it in a solid, porous combustible material, and finally drying the resultant mass, utilizing for such drying the waste heat of the charcoal furnace. I preferably use charcoal because that possesses the property of absorbing many times its own weight of liquid, and the charcoal required for this purpose may be economically produced at all paper making plants, as there is an abundance of wood waste resulting from the discharge of the barkers, saws and chippers.

The fuel material so produced may be advantageously used at the mill, and any surplus has a ready market.

The conversion of the wood waste into charcoal and the impregnation of the latter with the waste liquor thus produces a material of higher fuel value than that originally possessed by the charcoal. The economic value of the fuel material so produced is ample to carry at a profit the cost of installation and upkeep of the required apparatus; also the cost of carrying on my method of operation, and the cost of transporting the surplus fuel material to the market.

In carrying my invention into practice I preferably use the digester "relief" for effecting, in whole or in part, the evaporation and concentration of the liquor to a syrupy consistency.

I enhance the power of absorption of the charcoal by heating it to a high temperature thus expanding and partially expelling the gas which fills its pores; and while the charcoal is in that state I bring the concentrated waste liquor from the evaporators into contact therewith in an enclosure so as to prevent the dispersion of the heat in the charcoal by the external air. Hence, since the waste liquor has a lower temperature than the charcoal, the contact of the latter with the waste liquor will result in a reduction in temperature of the charcoal, cause the gas in its pores to contract, and thus creating a partial vacuum and in that way induce the saturation of the charcoal with the waste sulphite liquor.

In carrying my invention into practice I use an apparatus of the type shown in the accompanying drawings, in which:

Figs. 1 and 3 diagrammatically show two halves of an apparatus which I have found convenient for practicing my method; the arrows in these figures indicate the path of the various materials.

Fig. 2 is a larger scaled sectional view through one unit of my multiple unit retort.

$a$ represents a digestor of a type commonly used in the process of making sulphite pulp, the pulp being withdrawn through the pipe $b$, and the sulphite liquor being withdrawn through the pipe $c$; such pipes being provided with valves $b'$ and $c'$ respectively. The digester is provided with valve-controlled outlets $d$ and $e$ for the relief gases generated in the process. To permit the use of these gases as a heating medium in my method, I connect the outlets $d$ and $e$ to a common pipe $f$, which is connected to a coil $g$ in an evaporating pan $h$, into which the sulphite liquor flows as discharged from the digesters.

I preferably provide a valve-controlled auxiliary steam line $i$ also, which may be used to supply steam for the coil $g$, in case the relief gases from the digester are either not sufficient, or not available for heating the coil.

The evaporating pan $h$ may consist of a covered vat, and the vapors given off by heating the sulphite liquor in this vat are carried away by the outlet pipe $j$ which connects with the first unit $k$ of a multiple effect evaporator. Thus the latent heat of evaporation of the vapors conducted through the outlet pipe $j$, may be used to heat the first unit of the multiple effect evaporators $k$, $k'$ and $k^2$, which are connected in series as hereinafter described and which are used to further concentrate the sulphite liquor.

The sulphite liquor is withdrawn from the bottom of the evaporating pan $h$ through a pipe $l$, and passes through the tubes $k^3$ in the first evaporator unit $k$, which tubes are heated by the vapor introduced into this evaporator unit $k$ through the pipe $j$ from the vat $h$. I propose to use latent heat of evaporation of the vapor given off from the evaporating pan $h$ to effect in the first evaporator unit $k$ the partial evaporation and concentration of the waste sulphite liquor. The condensate of said vapor is withdrawn from the drain pipe $m$.

The vapor given off by the evaporation of the liquor in the first evaporator unit $k$ is used to further concentrate the waste sulphite liquor while passing through the second evaporator unit $k'$, and the vapor produced in the latter unit $k'$ will be used to evaporate the waste sulphite liquor when it passes through the third evaporator unit $k^2$. Enough of these evaporator units are provided to produce the desired degree of concentration of the waste liquor, and the latter is then run into a covered vat $n$, through the pipe $n'$.

To aid evaporation, the units of the multiple effect evaporator are connected in series to a vacuum pump (not shown) by a pipe $o$. The evaporator units $k'$ and $k^2$ are provided with drain pipes $m'$ and $m^2$ respectively to remove the condensate of the vapor. The vapor generated in the first evaporator unit $k$ is conducted to the second unit $k'$ by the pipe $j'$, and from the second unit $k'$ to the third unit $k^2$ by a pipe $j^2$; and the concentrated waste sulphite liquor is carried forward to the vat $n$ by pipes $l'$, $l^2$ and $n'$.

To provide the charcoal for my process, I purpose to use the waste wood of the paper mill, such as obtained from the barkers, saws and chippers. This waste wood is deposited in a hopper $p'$ of the charcoal furnace $p$. The hopper is provided with a spiral conveyor $p^2$ which discharges the fuel into the heated portion of the charcoal furnace. Within this heated portion a number of horizontal spiral conveyors $p^3$, $p^4$, $p^5$, $p^6$, and $p^7$ carry the charcoal along a circuitous path through the furnace. These spiral conveyors operate in enclosed chambers, and the heat applied to the walls of these closed chambers, roasts or carbonizes the waste wood to produce the charcoal. The charcoal passes from the discharge end of the lowermost spiral conveyor $p^7$ into a transversely arranged spiral conveyor $p^8$, which discharges the fuel into the vat $n$, which is filled with the syrupy concentrated waste sulphite liquor.

I further purpose to utilize the gases given off from the roasting of the charcoal to heat the charcoal furnace as well as to heat the driers, which will be hereinafter described. For that purpose I provide a gas manifold $q$ at the top of the charcoal furnace $p$, into which the gases given off from the charcoal are discharged. From this manifold the gases pass through the conduit r either to the bottom of the charcoal furnace through the pipes s, or to the drier t through a continuation r' of the pipe r. I provide suitable valves s', $r^2$ and $r^3$ for controlling the passage of the gases through these conduits. If the gases produced in the charcoal furnace are either insufficient or inaccessible, a combustible gas can be introduced into the charcoal furnace through the valve controlled auxiliary pipe u, or to the driers through the valve controlled auxiliary pipe u'.

The inlet $p^9$ for the gas, and the inlet $p^{10}$ for the air used to heat the charcoal furnace are both located adjacent the discharge end of the spiral conveyor $p^7$ and thus said discharge end is at the point of greatest heat intensity in the furnace. Thus the charcoal when it is being discharged from the carbonizing furnace is gradually heated to its maximum degree as it passes through the furnace, and at its maximum heat is quickly discharged without contact with the atmosphere or other heat absorbing agencies into the vat n containing the concentrated waste sulphite liquor. The heat given to the charcoal expands the gas contained within its pores, and hence when the charcoal is immersed in said waste liquor, it causes a partial vacuum in said pores, inducing a rapid absorption of the liquor by the charcoal to the degree of saturation.

The charcoal is then discharged from the vat n, through a conduit v, into the drier t. A baffle t' is provided directly below the discharge end of the conduit v, by which the charcoal is diverted into a horizontally arranged tapered tumbling barrel $t^2$. The taper of the tumbling barrel causes the saturated charcoal to move longitudinally through the barrel t and thus causes its discharge from its diverging end. A baffle plate $t^3$ directs the charcoal from the diverging end of the barrel $t^2$ to the converging end of the tumbling barrel $t^4$. The tumbling barrels are vertically stacked and each is provided with a baffle plate to direct the saturated charcoal to the tumbling barrel directly below.

Enough of these tumbling barrels are provided to dry the saturated charcoal to the desired degree.

The drying section of my apparatus may comprise a series of tumbling barrels, $t^2$ and $t^4$, and also $t^6$ and $t^8$, provided respectively with baffle plates t' and $t^3$, $t^5$ and $t^7$.

The saturated charcoal passes from the end of the lowermost tumbling barrel $t^8$ at a predetermined state of dryness, and the spiral conveyor $t^8$ conveys the product to any desired receiver or hopper.

As previously mentioned, the heat for the drier is preferably produced by the burning of the gases carried off from the charcoal furnace, or by the waste heat of the chimney gases from this furnace, but may be supplied by any other heating agency, if the latter is not available or sufficient.

My method may thus be summarized into the following steps:

1. Partially concentrating the waste sulphite liquor by evaporation.
2. Utilizing the relief gases of the digester for that purpose.
3. Absorbing the partially concentrated liquor in a solid porous combustible material, preferably charcoal, and utilizing the wood waste for making the latter.
4. Promoting such absorption by bringing the porous material to a high temperature, then bringing the partially concentrated waste sulphite liquor in contact therewith in an enclosure in which external heat absorbing agencies are excluded.
5. Drying the resultant material to a predetermined degree.
6. Utilizing the gases evolved in the charcoal furnace for that purpose.

The fuel material so produced consists of a solid combustible material, preferably charcoal, impregnated with concentrated waste sulphite liquor, which results in a fuel material of higher fuel value than the original charcoal and which may either be burned as a solid or be converted into a gas, if the latter type of fuel is desired.

I claim:

1. In the process of manufacturing sulphite pulp, the method of effecting the economical disposal of the waste sulphite liquor, consisting in concentrating the liquor by evaporation to a syrupy consistency, and then mixing the resultant syrupy liquor with a porous readily combustible material heated to a higher degree than the liquor thereby to cause first the expansion and partial expulsion of the gas in the pores of said combustible material, and then causing a partial vacuum in said pores by bringing said liquor in contact with said material, thus inducing the saturation of said pores with said syrupy liquor.

2. In the process of manufacturing sulphite pulp, the method of effecting the economical disposal of the waste sulphite liquor, consisting in concentrating the liquor by evaporation to a syrupy consistency, then mixing the resultant syrupy liquor with a porous readily combustible material heated to a higher degree than the liquor thereby to cause first the expansion and partial expulsion of the gas in the pores of said combustible material, and then causing a partial vacuum in said pores by bringing said liquor in contact with said materal, thus inducing the saturation of said pores with said syrupy liquor, said intermixture being effected in an enclosure so as to prevent the dispersion of the heat in the material by the external air.

3. In the process of manufacturing sulphite pulp, the method of effecting the economical disposal of the waste sulphite liquor, consisting in concentrating the liquor by evaporation to a syrupy consistency through the medium of the heat inherent in the digester relief gases, and then mixing the resultant syrupy liquor with a porous readily combustible material heated to a higher degree than the liquor, thereby to cause first the expansion and partial expulsion of the gas in the pores of said combustible material, and then causing a partial vacuum in said pores by bringing said liquor in contact with said material, thus inducing the saturation of said pores with said syrupy liquor.

ALFRED M. THOMSEN.